United States Patent
Ikusue et al.

(10) Patent No.: US 6,364,797 B1
(45) Date of Patent: Apr. 2, 2002

(54) MOTORCYCLE TRANSMISSION

(75) Inventors: Masato Ikusue; Daisuke Nakao, both of Iwata (JP)

(73) Assignee: Yamaha Hatsudoki Kabushiki Kaisha (JP)

( * ) Notice: Subject to any disclaimer, the term of this patent is extended or adjusted under 35 U.S.C. 154(b) by 0 days.

(21) Appl. No.: 09/429,418

(22) Filed: Oct. 28, 1999

(30) Foreign Application Priority Data

Oct. 28, 1998 (JP) .......................................... 10-307669

(51) Int. Cl.⁷ .......................... F16H 7/00; B62J 13/00; B62M 11/00
(52) U.S. Cl. ....................... 474/148; 180/230; 474/144; 74/606 R
(58) Field of Search .............................. 474/101, 113, 474/138, 135, 133, 109, 111, 117, 13, 14, 158, 148, 150, 152, 151; 180/219, 230, 220; 416/169 R, 170 R; 74/606 R

(56) References Cited

U.S. PATENT DOCUMENTS

| | | | | |
|---|---|---|---|---|
| 4,345,664 A | * | 8/1982 | Anno et al. ..................... | 474/13 |
| 4,494,623 A | * | 1/1985 | Kurata et al. ................ | 180/230 |
| 5,254,046 A | * | 10/1993 | Hohnl ......................... | 474/113 |
| 5,501,292 A | * | 3/1996 | Kawashima et al. ........ | 180/220 |
| 5,890,980 A | * | 4/1999 | Heyng ......................... | 474/158 |
| 6,077,041 A | * | 6/2000 | Carter, Jr. ................ | 416/169 R |

* cited by examiner

*Primary Examiner*—David A. Bucci
*Assistant Examiner*—Marcus Charles
(74) *Attorney, Agent, or Firm*—Knobbe, Martens, Olson & Bear LLP

(57) ABSTRACT

A motorcycle has a final drive, including a flexible drive member, such as a chain or a belt, that extends between the drive pulley and the driven pulley. A belt retention member is positioned proximate a forward portion of the final drive to reduce the likelihood of the belt skipping free of the drive pulley. The belt retention member preferably includes an upper belt retention portion and a lower belt retention portion. Preferably, the upper drive retention portion is positioned further forward relative to the lower belt retention portion such that the upper portion is moved more forward relative to an axis of rotation of the pulley. In this manner, the belt retention member allows more slack to be thrown during rapid acceleration from a decelerated state in the illustrated motorcycle.

11 Claims, 16 Drawing Sheets

MOTORCYCLE TRANSMISSION

BACKGROUND OF THE INVENTION

1. Field of the Invention

The present invention generally relates to motorcycle transmissions. More specifically, the present invention relates to final drive transmissions having flexible drive members secured in position by flexible drive member retention components.

2. Related Art

Motorcycles are often powered by internal combustion engines having output shafts. In some motorcycles, the output shaft is coupled to a final drive mechanism through a change speed transmission featuring a variety of gear ratios that can be selectively engaged. The output of the change speed transmission, in turn, drives an output pulley. Torque from the output pulley is transferred to an input pulley positioned on a rear wheel. A flexible drive member, such as a belt or chain for instance, preferably extends between the two pulleys.

The flexible drive member is susceptible to slipping during periods of rapid acceleration and deceleration. For instance, during a period of rapid acceleration, the output pulley is driving the wheel pulley. Accordingly, the flexible drive member slacks on the side of the pulleys moving in the direction from the wheel pulley to the output pulley. In addition, during rapid deceleration, the inertia of the rear wheel acts to drive the output pulley. Accordingly, the flexible drive member slacks on the side of the pulleys moving in the direction from the output pulley to the wheel pulley.

Because of the periodic slacking described above, the connection between the pulleys and the drive member can become unstable. For instances, the flexible drive member can skip relative to the pulley in a manner which effects the overall transfer of power between the engine and the rear wheel. In addition, as the flexible drive member slips relative to the pulleys, the flexible drive member can be thrown from the output pulley and disable the motorcycle. Thus, the vehicle will require frequent servicing to replace the flexible drive member on the pulleys. Moreover, the slackened portions of the flexible drive members can slap against other components of the motorcycle resulting in undue noise and unnecessary wear of both the flexible drive member and the components being slapped.

SUMMARY OF THE INVENTION

Accordingly, an improved mechanism for reducing the effects of flexible drive member slack in a motorcycle transmission is desired. Preferably, this mechanism includes retention members to maintain the relative positioning between a portion of the pulley and the flexible drive member during both acceleration and deceleration. Moreover, this arrangement preferably accommodates the tendency of the belt to be thrown forward by the drive pulley during rapid acceleration from a decelerated state to reduce accelerated wear on the retention members.

Accordingly, one aspect of the present invention involves a motorcycle transmission comprising a change speed transmission and a final drive. The change speed transmission has an input gear positioned on a first lateral side of the motorcycle transmission and an intermediate pulley positioned on a second lateral side of the motorcycle transmission. An output pulley of said change speed transmission is positioned on the first lateral side and is connected to an output shaft of the change speed transmission. The final drive comprises the output pulley of the change speed transmission, a driven pulley, and a flexible drive member extending around the output pulley and the driven pulley. The driven pulley is positioned rearward of the output pulley with at least one retaining member being positioned forward of the output shaft. The retaining member is capable of turning relative to a mounting shaft for the retaining member and comprises an outer contact surface. The flexible drive member is interposed between the outer contact surface and the output pulley. The flexible drive member is secured to the output pulley by the outer contact surface.

Another aspect of the present invention involves a motorcycle comprising an engine and a rear wheel. The engine is drivingly engaged to an output pulley with the output pulley being connected to an output shaft. The output shaft extends through a portion of a crankcase, and a final drive drivingly couples the output pulley and the rear wheel. The final drive comprises a flexible drive member that wraps around at least a portion of the output pulley. A rotary guide member is positioned forward of an axis of rotation of the output pulley. The flexible drive member passes between the rotary guide member and the output pulley such that the flexible drive member is substantially held in position on the output pulley by the rotary guide member.

BRIEF DESCRIPTION OF THE DRAWINGS

These and other features, aspects and advantages of the present invention will now be described with reference to the drawings of a preferred embodiment, which embodiment is intended to illustrate and not to limit the invention, and in which figures.

DETAILED DESCRIPTION OF THE PREFERRED EMBODIMENTS OF THE INVENTION

Figure 1:
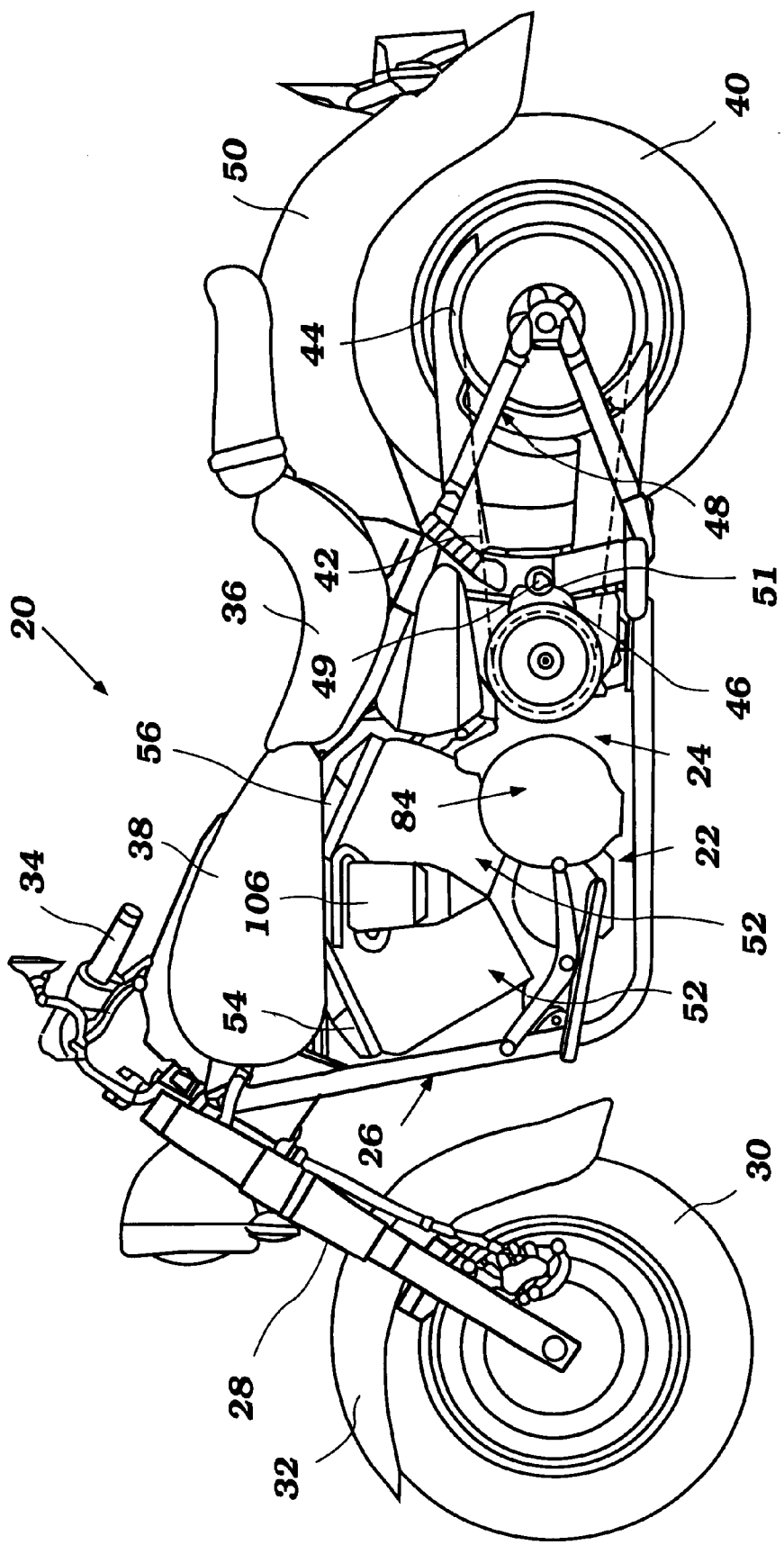
FIG. 1 is a side elevation view of a motorcycle constructed in accordance with certain features, aspects, and advantages of the present invention.

With reference initially to FIG. 1, a motorcycle is illustrated in side elevation view and is identified generally by the reference numeral 20. The motorcycle 20 is powered by an internal combustion engine 22 through a transmission 24 which is constructed in accordance with certain features, aspects and advantages of the present invention. The motorcycle 20 is shown as a typical environment in which the present invention can be used.

As is known to those of ordinary skill in the art, the motorcycle 20 is generally comprised of frame assembly 26 upon which the engine 22 is suspended. This frame assembly 26 also dirigibly supports a front fork 28 to which a front wheel 30 is rotatably journaled. A front fender 32 covers at least a portion of this front wheel 30. The steering of the vehicle is controlled by handlebar assembly 34 that is fixed to the upper end of the illustrated front fork 28 in a manner well known to those of ordinary skill in the art.

A rider seat 36 is carried by the frame assembly 26 rearward and generally above the engine 22. A fuel tank 38 is also supported by a portion of the frame assembly 26 in a location forward of the seat 36.

A rear wheel 40 is journaled by the frame assembly 26 in any suitable manner. The rear wheel is preferably attached to the frame assembly 26 through use of a rear arm 48. The illustrated rear arm 48 is arranged to pivot relative to the frame assembly 26 about a pivot shaft 49. Preferably a rear fender 50 is suspended above at least a portion of the rear wheel 40 in manners well known to those of ordinary skill in the art.

Figure 12:
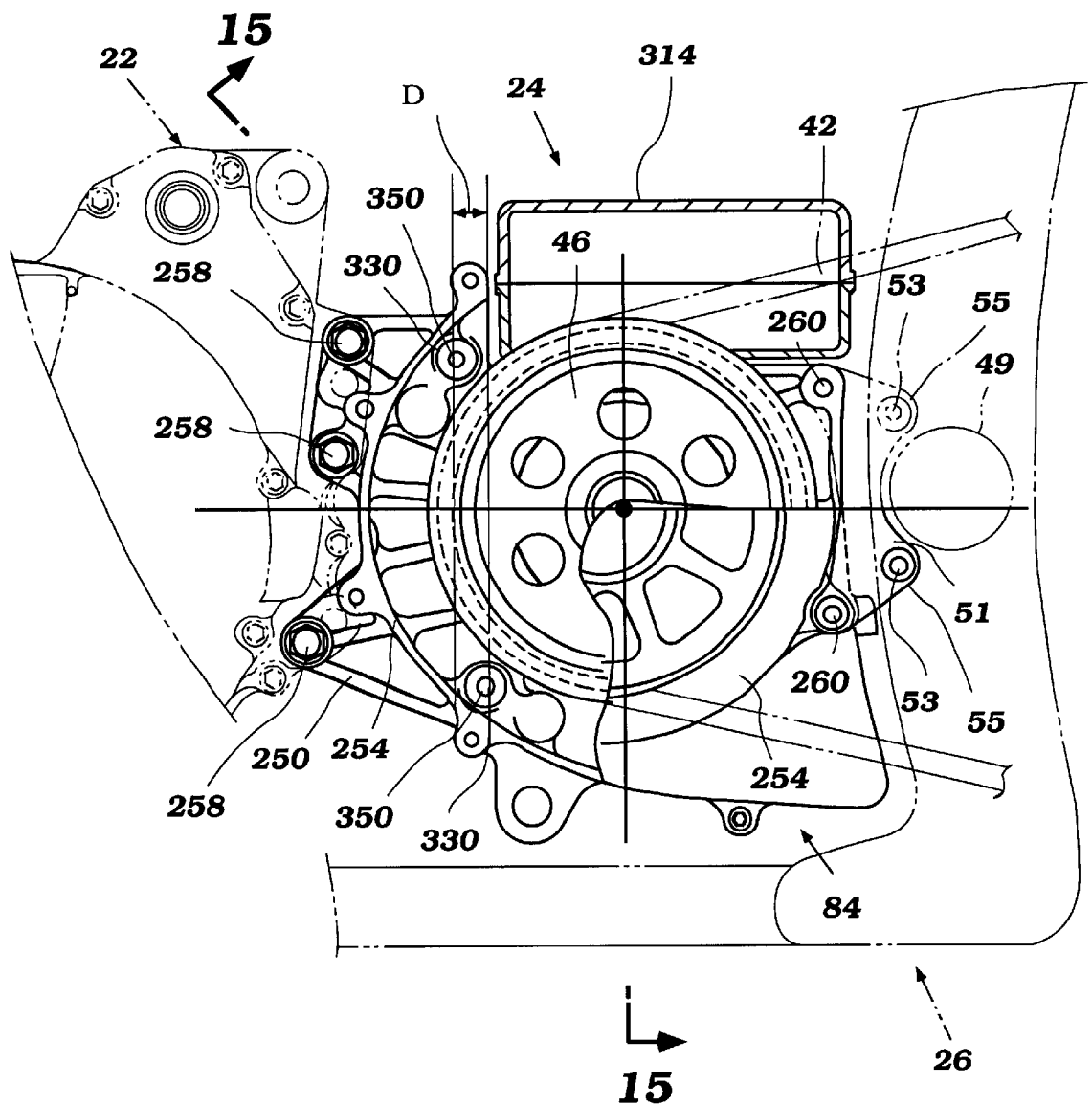
FIG. 12 is an enlarged sectioned view of a portion of the gear box taken from the same side as FIG. 1.

The illustrated rear wheel 40 is driven by the transmission 24, which is contained at least partially within a crankcase transmission assembly of the engine 22, through a final drive which can comprise a flexible drive element 42, such as a belt or chain, for example. The flexible drive element 42 extends around a driven pulley 44 and a drive pulley 46 and couples the two pulleys 44, 46 together for rotation. The location of the drive pulley 46 is preferably maintained by a bracket 51 that is attached to the crankcase 58 through the use of threaded fasteners 53. The bracket 51 preferably includes a recess that is positioned between two protrusions 55 and that is proximate to the pivot shaft 49, as illustrated in FIG. 12. The construction of the transmission including the final drive will be described in more detail below.

The construction of the engine 22 will now be described in more detail referring first primarily to FIGS. 2 and 3. In the illustrated motorcycle 20, the engine 22 is of the V-twin type and operates on a four cycle principal. To this end, the engine 22 is comprised of an engine body assembly including a cylinder block portion, indicated generally by the reference numeral 52, which is formed with a pair of angularly related cylinder banks 54, 56 that are preferably disposed at an angle to each other. These cylinder banks 54, 56 are formed by cylinder barrels 57 that affixed to an upper portion of a crankcase member 58, which, with the cylinder banks 54, 56, completes the cylinder block portion 52.

A crankcase member 58 defines a crankcase portion of the engine body that includes the combined crankcase transmission assembly 24 and rotatably journals a crankshaft 60 in any suitable manner. The crankcase member 58 preferably is comprised of a plurality of housing components, which will be described in detail below in conjunction with FIGS. 11–15.

Figure 3:
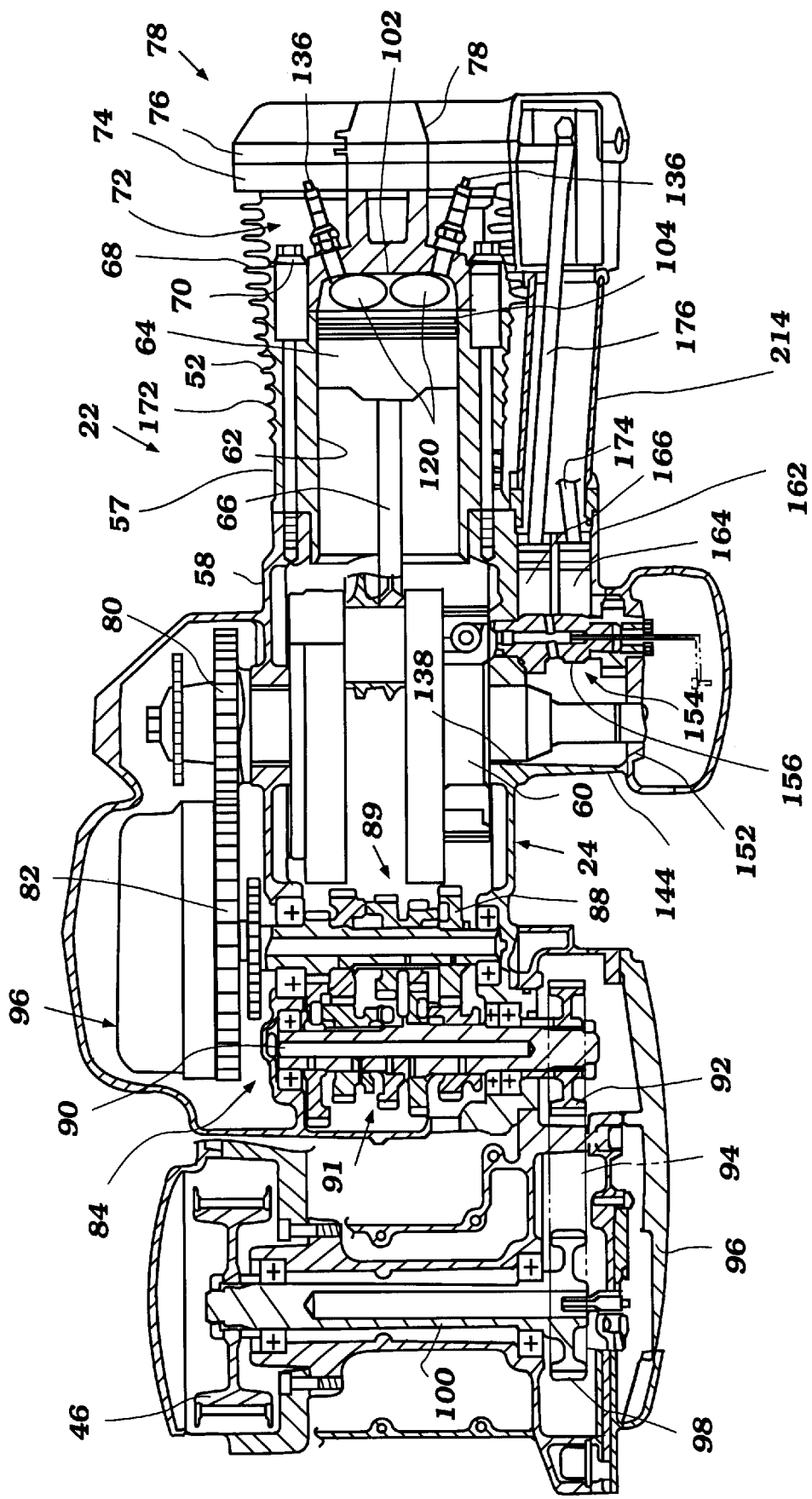
FIG. 3 is a cross-sectional view taken through the engine generally along the line 3—3 in FIG. 2.

With reference now to FIG. 3, each cylinder bank 54, 56 is formed with a respective cylinder bore 62 in which a piston 64 reciprocates. The cylinder bore 62 preferably extends, at least in part, through the cylinder barrel 57. The pistons 64 are connected to the upper or small ends of connecting rods 66 in any suitable manner. The connecting rods 66, in turn, are journaled in side-by-side relationship on a throw of the crankshaft 60 as is generally known by those of ordinary skill in the art.

A cylinder head assembly, indicated generally by the reference numeral 68, is affixed to each cylinder bank 54, 56 in any suitable method. In the illustrated motorcycle 20, the cylinder head assembly 68 is affixed to each cylinder bank 54, 56 through threaded fasteners 70. Of course any other suitable method of attaching the cylinder head assembly to the cylinder banks can also be used.

The illustrated cylinder head assemblies 68 are each generally made up of four major components. These components comprise a main cylinder head member 72, a cam shaft carrier 74, a cylinder head cover 76 and a valve cover 78. These components are assembled together to form, at least in part, the cylinder head assemblies 68 and some portions of these components will be described in more detail below. As a general matter, the cylinder head assemblies are not directly related to the present transmission and, therefore, are not described in greater detail.

Figure 2:
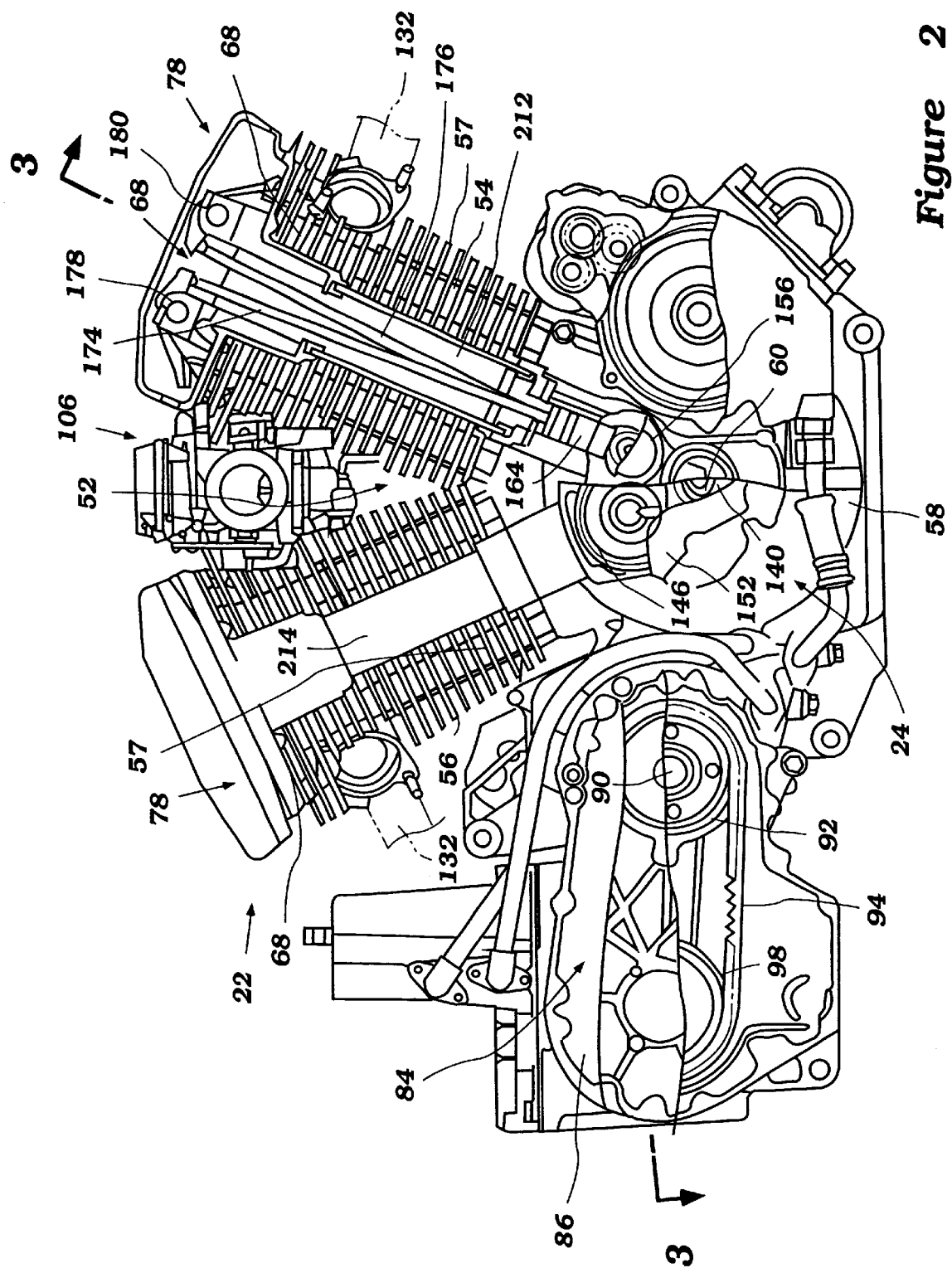
FIG. 2 is a side elevational view of an engine of the motorcycle of FIG. 1 looking in the opposite direction from FIG. 1 and with the push rod covers either partially or completely removed and other portions broken away to show the valve operating mechanism and the gear box.

With continued reference to FIGS. 2 and 3, a change speed transmission 84 is drivingly connected to the final drive transmission 100 for driving the rear wheel 40 from the crankshaft 60. The change seed transmission 84 will now be described. As has been previously noted, this transmission 84 is contained, at least in part, within the combined crankshaft transmission assembly.

With reference now to FIG. 3, affixed to one end of the crankshaft 60, is a main drive gear 80 which is enmeshed with a driven gear 82 of the change speed transmission 84. The driven gear 82 is coupled via a selectively actuatable multiple disc clutch 86 to a primary shaft 88 of the change speed transmission 84.

This primary shaft 88 carries a plurality of primary gears 89 which are enmeshed with secondary gears 91 that are carried on a secondary shaft 90 of the transmission 84. By selectively coupling the gears on the primary and secondary shafts 88, 90 to the shafts 88, 90 through a suitable shifting mechanism, it is possible to change the drive ratio between the crankshaft 60 and the secondary shaft 90. The secondary shaft 90 thus functions as the output shaft of the change speed transmission 84.

An understanding of these details of the transmission 84 is not believed to be necessary to permit those of skill in the art to practice the present invention. It should be readily apparent that the invention can be utilized in conjunction with any desired type of transmission.

The secondary transmission shaft 90 or output shaft of the transmission 84 carries a sprocket or toothed wheel 92, which is engaged with a further flexible drive member 94, such as a belt or chain, for instance. This flexible drive member 94 is contained within a transmission case, which can be enclosed by a cover assembly 96. The flexible drive member 94 drives a further sprocket 98 that is coupled to a final drive transmission 100 for the change speed transmission 84. The drive pulley 46 of the final drive transmission 100 is affixed to the opposite end of this output shaft in the illustrated motorcycle 20. As discussed above, the belt 42 that is attached to the drive pulley 46 drives the driven pulley 44 that is attached to the rear wheel 40 to power the motorcycle 20 along the ground.

Preferably, the change speed transmission transfers the rotational motion from one set of gears positioned on one side of the motorcycle to a second set of gears positioned on the other side of the motorcycle. In addition, an output from the change speed transmission to the rear wheel is preferably positioned on the same side of the motorcycle as the output from the crankshaft. Because of the crisscross nature of the change speed transmission, the transmission can be compactly structured in both the lateral and longitudinal directions.

With reference now to FIGS. 2–5, the construction of the cylinder head assembly 68 will be described in more detail. As has been previously noted, the cylinder head assembly 68 is made up of four major components: the main cylinder head member 72, the cam shaft carrier 74, the cylinder head cover 76 and the valve cover 78. These components are preferably formed from light alloy materials such as cast aluminum or aluminum alloys for example.

The illustrated main cylinder head member 72 is formed with a recess 102 in its lower surface. The recess 102 preferably overlies the cylinder bore 62 and, in cooperation with the head of the piston 64 and the cylinder bore 62, forms the combustion chamber 104 of the cylinder bank 54, 56. In the illustrated motorcycle 20, the cylinder head recess 102 is formed with four ports, two of which lie on the side of the engine toward the valley between the cylinder banks 54, 56 and comprise intake ports 114.

Figure 4:
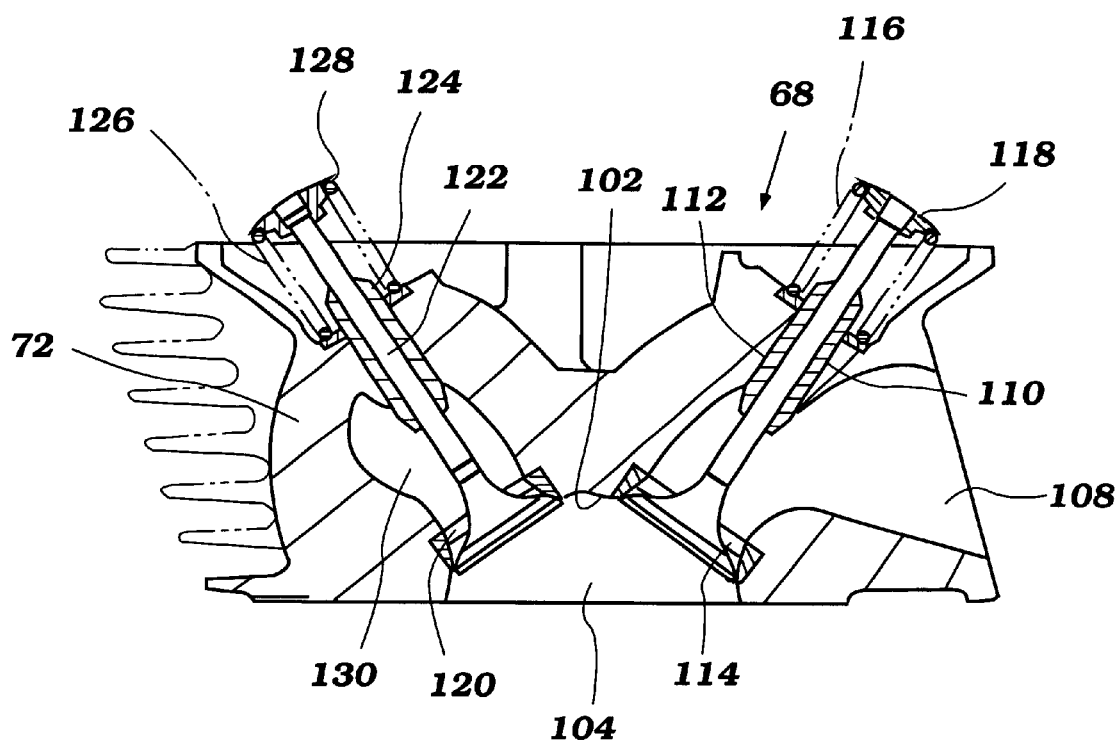
FIG. 4 is an enlarged, partially sectioned view of a cylinder head member illustrating a valve arrangement.

These intake ports 114 are served and supplied with a fuel air charge by an induction system (not shown). This induction system preferably includes carburetors 106 or other charge formers that are conveniently disposed between the cylinder banks 54, 56, and which are associated with the intake passages 108 of the respective cylinder head assemblies 68. These intake passages 108 are illustrated in FIG. 4, for instance. The illustrated passages 108 terminate at an outer surface of the cylinder head member 72 and receive the respective carburetors 106. At this point, it might be well to state that although the invention is described in conjunction with a carbureted engine, the principals of the invention can be equally as well utilized with engines having other types of charge formers such as fuel injection systems.

Poppet type intake valves 110 are slidably supported in each illustrated cylinder member 72 in any suitable manner. In the illustrated motorcycle 20, the valves 68 are slidably supported in intake valve guides 112. These valves 110 are urged toward their closed position in closing relationship to the intake ports or openings 114. Preferably, the valves are urged into this closed relationship through the use of coil compression spring assemblies 116. These spring assemblies 116 act against keeper retainer assemblies 118 for holding the valve 110 in a closed position relative to the opening 114. The mechanism for opening the valve 110 will be described later.

On the side of the cylinder head recess 102 opposite the intake ports 114, there are provided exhaust ports 120. The exhaust ports are preferably valved by poppet type exhaust valves 122, which are also reciprocally mounted in a cylinder head member 72 through the use of valve guides 124. Coil compression spring assemblies 126 act against keeper retainer assemblies 128 and hold the exhaust valves 122 in a closed position relative to the opening or exhaust port 120. These exhaust valves 122 are also opened in a manner which will also be described shortly.

The exhaust ports 120 and the cylinder head members 72 terminate in respective exhaust outlet openings 130 formed in a cylinder head members 72. The exhaust outlet openings 130 are preferably adapted to detachably receive an exhaust system, which is indicated in phantom and which is labeled by reference numeral 132, in the illustrated motorcycle 120. The exhaust system 132 discharges the exhaust gases from the combustion chambers 104 to the atmosphere in any suitable manner. Because the exhaust system constitutes no part of the present invention, it has not been illustrated and will not be further described. Those of ordinary skill in the art will readily understand how the invention can be utilized with a wide variety of types of exhaust systems.

Figure 5:
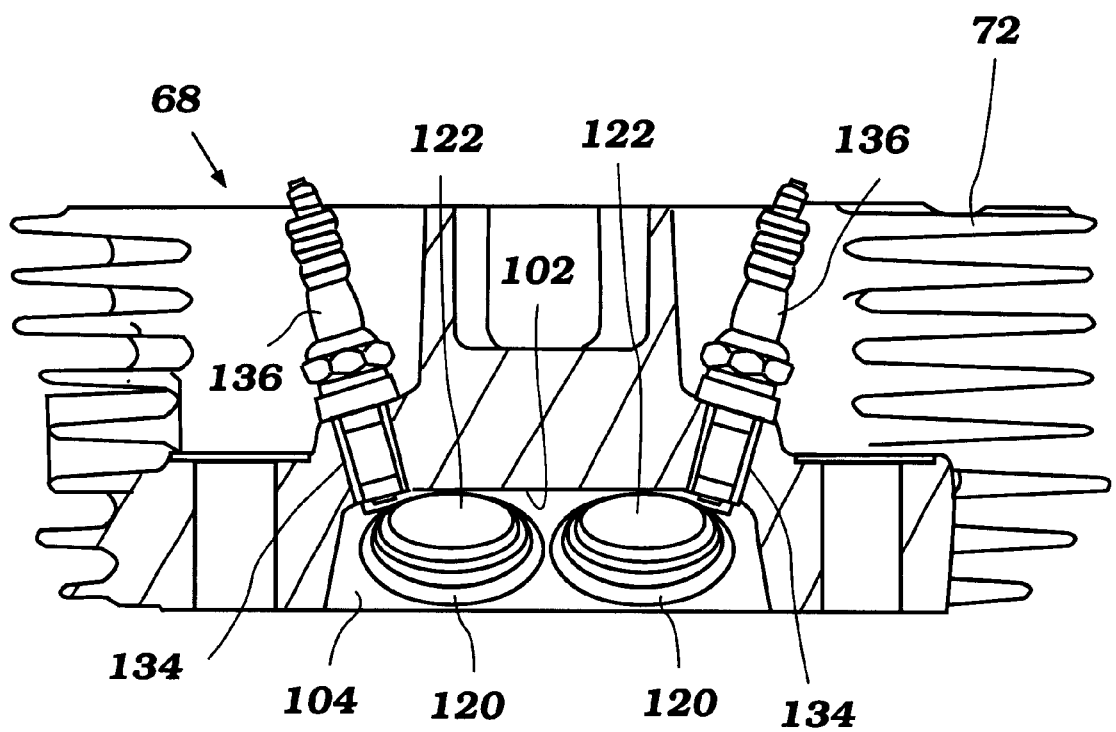
FIG. 5 is an enlarged cross sectional view through one of the cylinder head members shown in FIG. 4 taken along a plane perpendicular to that plane.

With reference now to FIG. 5, the four valve per cylinder head assembly 72 as thus far described is further complimented by a dual ignition system. The dual ignition system ignites the air fuel charge within the combustion chamber 104 to provide the combustion necessary to power the internal combustion engine 22. To this end, the cylinder head members 72 are each formed with a pair of tapped openings 134 that receive sparkplugs 136. The sparkplugs 136 are fired by any suitable ignition system and preferably ensure rapid flame propagation and substantially complete combustion of the air fuel charge that has been delivered to the combustion chambers 104 from the carburetors 106.

The valve operating mechanism for operating the intake valve 110 will now be described by particular reference to FIGS. 2, 3, and 6–10, although portions of this valve operating mechanism also appear in other figures.

Figure 6:
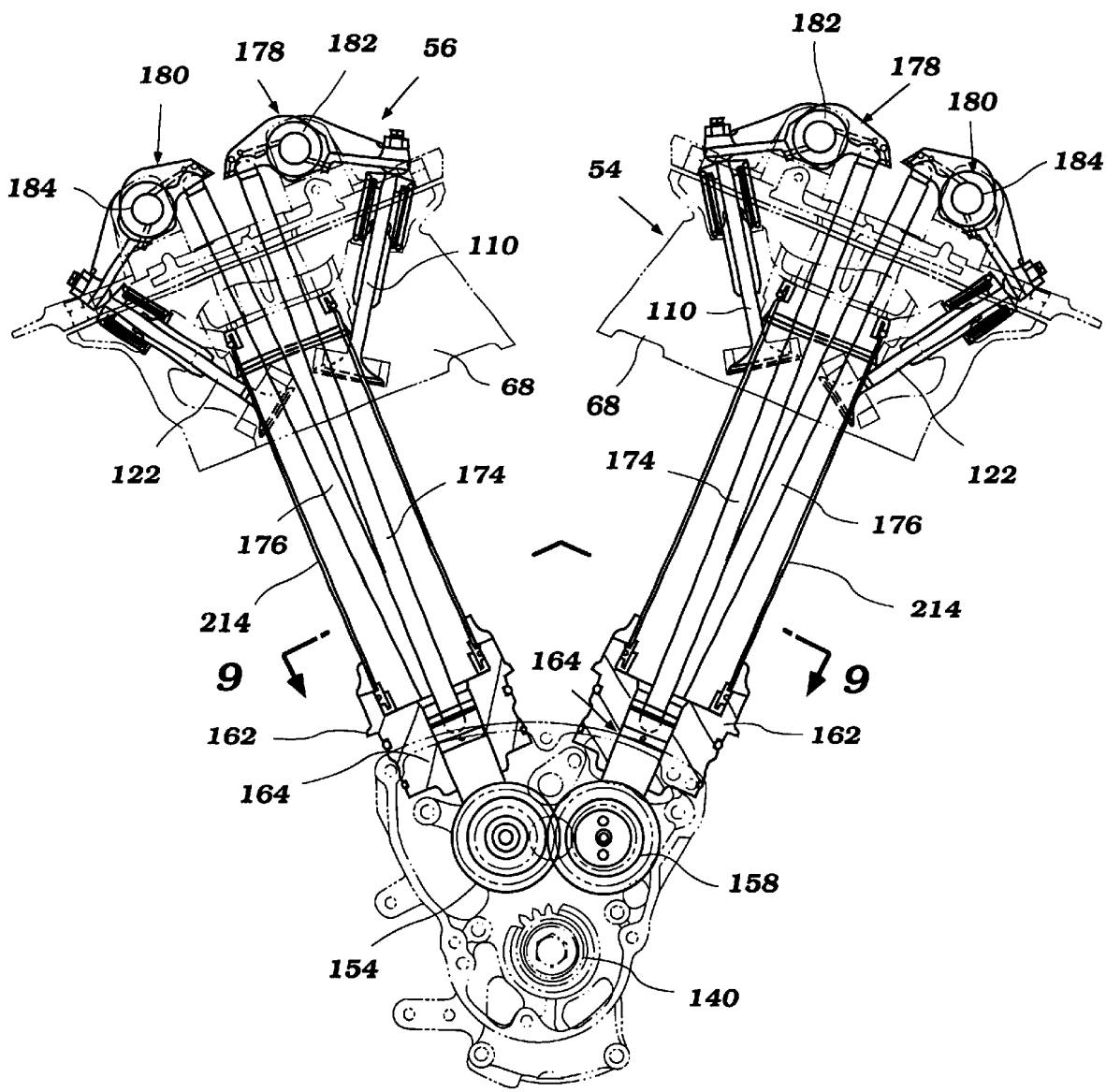
FIG. 6 is a sectioned view of the push rod arrangement and camshaft drive mechanism used in the engine.
Figure 8:
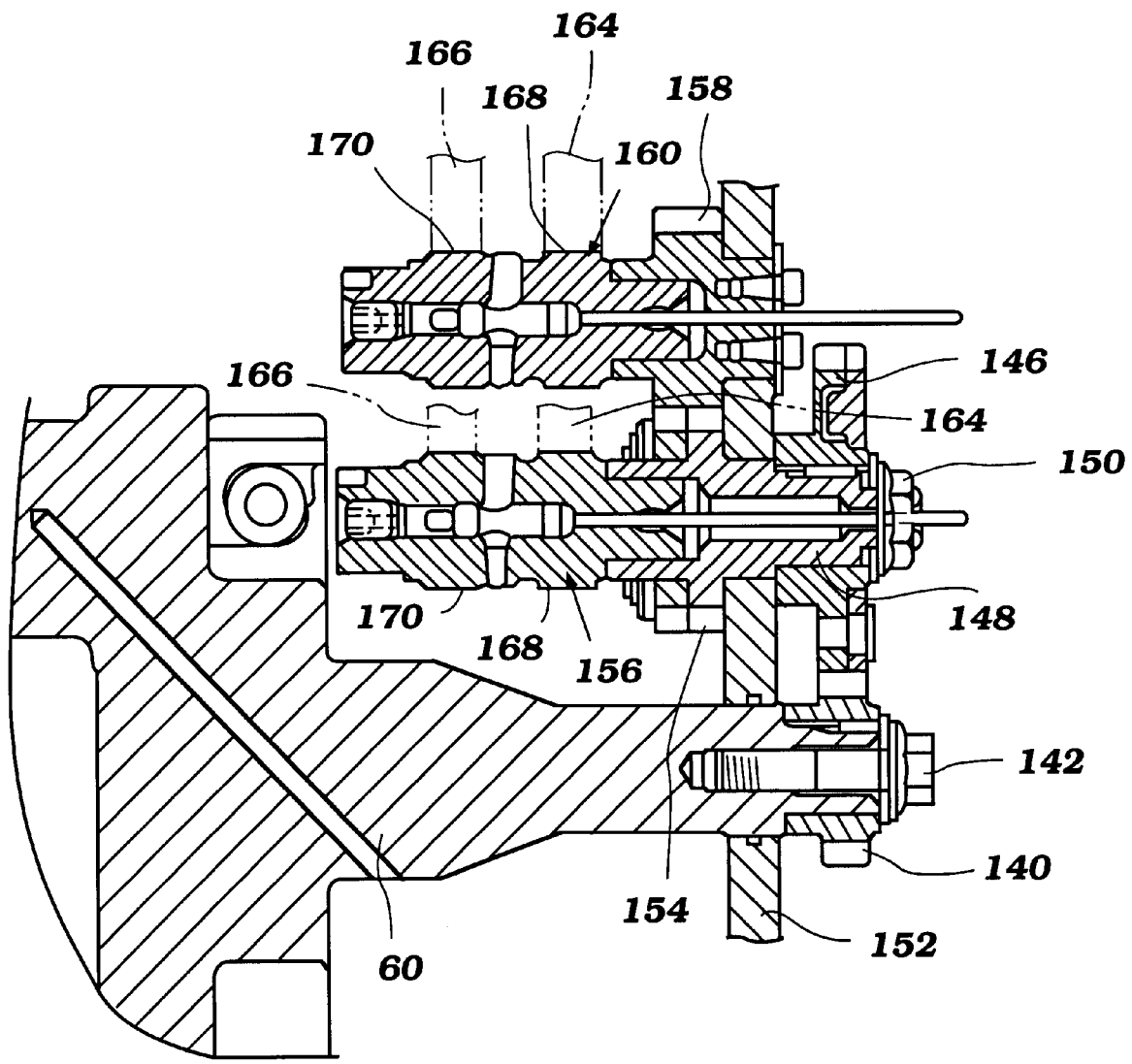
FIG. 8 is a cross sectional view taken along the line 8—8 in FIG. 7 illustrating further details of the cam shaft drive.

First, with reference to FIG. 3, the crankcase member 58 is formed with an internal wall that has a central opening 138 through which one of the ends of the crankshaft 60 extends. A timing gear 140, which is illustrated in FIG. 6, is affixed to this end of the crankshaft 60 for rotation by means that includes a fastener assembly 142, which is shown in FIG. 8. The fastener assembly 142 also preferably includes a key arrangement so that the timing gear 140 will be driven at the crankshaft speed. The wall of the crankcase member through which the crankshaft 60 extends is also formed with a cylindrical projection indicated in the drawings by the reference numeral 144.

Figure 7:
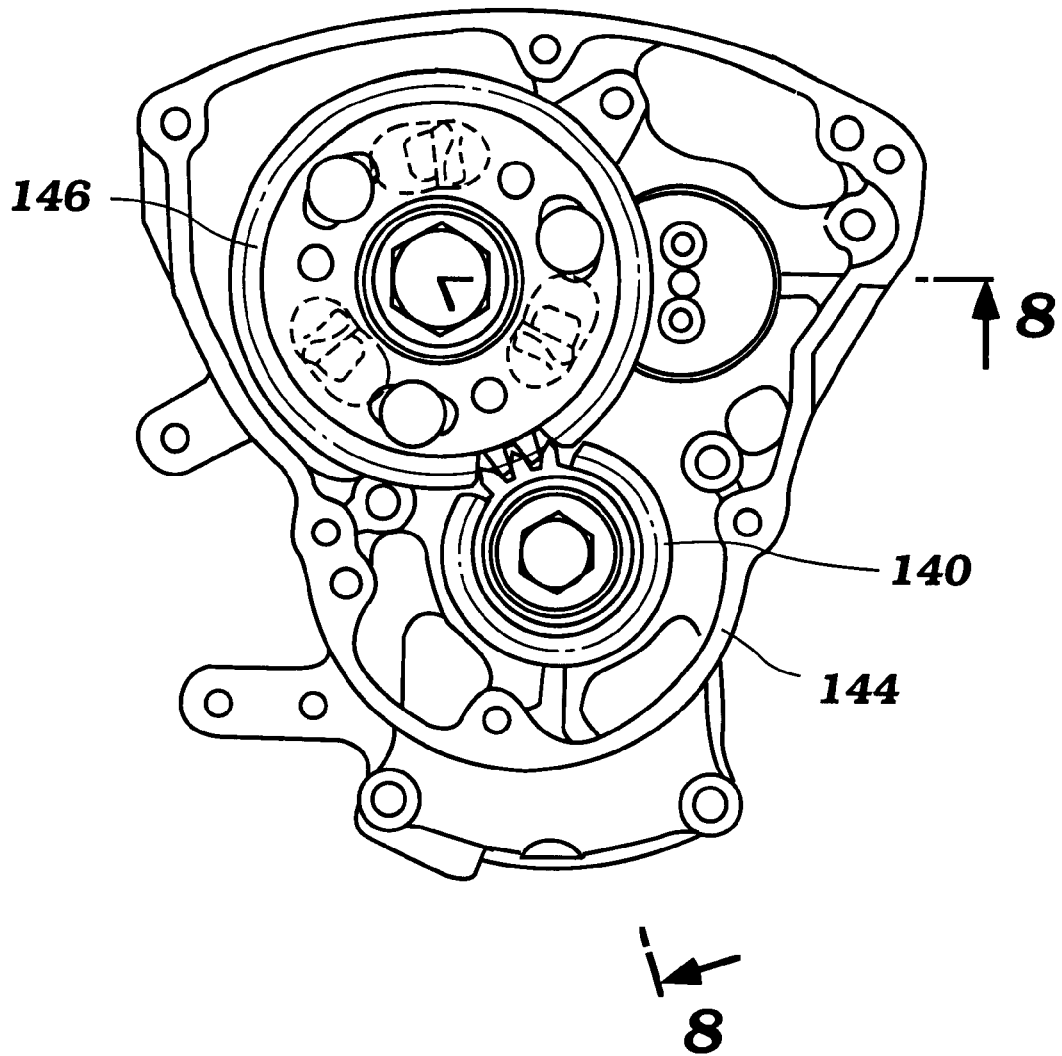
FIG. 7 is a sectioned view looking in the same direction as FIG. 6 but showing the timing drive for the camshafts.

As best seen in FIGS. 7 and 8, the timing gear 140 is encircled by the projection 144 and, in this area, is enmeshed with a driven camshaft timing gear assembly, which is indicated generally by the reference numeral 146. This timing gear assembly 146 is desirably of the split-gear type so as to take up backlash in the system. This assembly is secure to a cam driving shaft 148 through the use of a threaded fastener 150. Preferably, there is a 2-to-1 speed reduction in this transmission, as is well know to those of ordinary skill in the art.

With reference to FIG. 8, the shaft 148 penetrates through a cover 152 that, together with the wall projection, forms a portion of the gear case. At this location, the shaft 148 drives a first camshaft driving gear 154, which is driving connected to a first camshaft 156 that is associated with one of the cylinder banks 54, 56. In the illustrated figures, this is the cylinder bank 54.

The driving gear 154 also preferably is a split-type backlash take-up type of gear and is drivingly coupled to a second camshaft driving gear 158, which is associated with a camshaft 160 for the remaining cylinder bank; i.e., the cylinder bank 54. Because of the relationship between the driving gears 154, 158, these gears will rotate in opposite directions.

In the area above the crankcase member projection 144, adjacent each camshaft 156, 160 and on the upper side thereof, is formed an opening that receives a tappet body 162. This is best shown in FIG. 6. Each tappet body 162 is formed with a pair of bores that receive, respectively, an intake tappet 164 and an exhaust tappet 166 for the respective cylinder banks. These tappets 164, 166 are engaged by the intake and exhaust camlobes 168 and 170, respectively, of each camshaft 156, 160. Because the construction of each camshaft is basically the same, except for the fact that they rotate in opposite directions, the same reference numerals are applied to the camlobes 168, 170 and the tappet bodies 164, 166 for each cylinder bank.

With reference to FIG. 2, the engine 22 is preferably air cooled, and to this end, both the cylinder barrels 57 are formed with cooling fins 172. These cooling fins 172 extend generally around the entire periphery of the engine body but can be partially interrupted on the sides adjacent the camshaft 156, 160 so as to provide recesses through which push rods 174, 176 for each cylinder bank extend. The push rods 174 are associated with the intake tappets 164, while the push rods 176 are associated with the exhaust tappets 166. The illustrated push rods 174, 176 extend upwardly and, in effect, cross over each other slightly, as seen in FIGS. 2 and 6. These push rods 174, 176 preferably are encircled by a protective tube 214 in a manner which will be described shortly.

Figure 10:
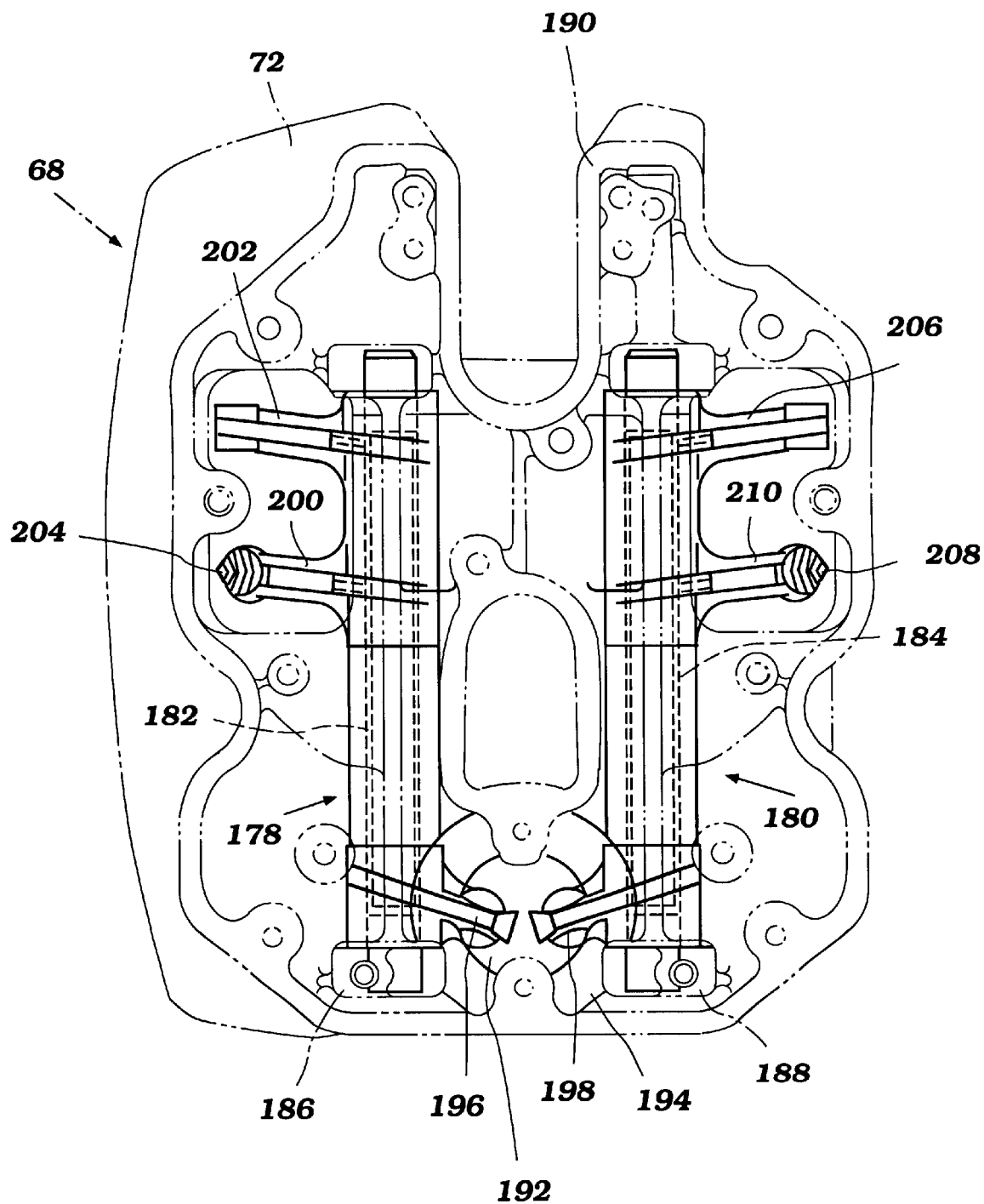
FIG. 10 is a section view of a cylinder head illustrating a rocker arm arrangement of the engine.

With reference now primarily to FIGS. 2, 6 and 10, the intake and exhaust valve push rods 174, 176 respectively extend upwardly along the side of the respective cylinder barrels 57 to the cylinder head assemblies 68. The upper ends of these push rods 174, 176 preferably cooperate with respective rocker arms 178, 180, which are supported for pivotal movement on the rocker arm shafts 182, 184.

These rocker arm shafts 182, 184 are journaled in bosses 186, 188, respectively, formed in the cylinder head rocker arm support member 190, as can be best seen in FIG. 10. The rocker arms 178, 180 pass through a central opening 192 formed in a downwardly extending guide portion 194 of the rocker arm carrier 190.

The illustrated rocker arms 178, 180 have follower portions 196, 198 that define spherical sockets into which the ends of the push rods 174, 176 extend. These extensions 196, 198 are formed at one side of the rocker arm assemblies 178, 180. At the other ends thereof, the rocker arm assembly 178 has a pair of extending arms 200 and 202 that are engaged with the tips of the intake valves 110 for their actuation. An adjusting screw 204 is provided only on one of these rocker arm extensions 202, 204 (i.e., extension 204) so as to permit adjustment of the lash in the intake valve train.

In a similar manner, the rocker arm 180 has a pair of valve actuating portions 206 and 208 that cooperate with the tips of the stems of the exhaust valves 122 for their actuation. Again, only the rocker arm portion 208 carries an adjustment screw 210 for adjusting the lash in the exhaust valve train. Of course, the other rocker arm or both rocker arms can include an adjustment screw.

Figure 9:
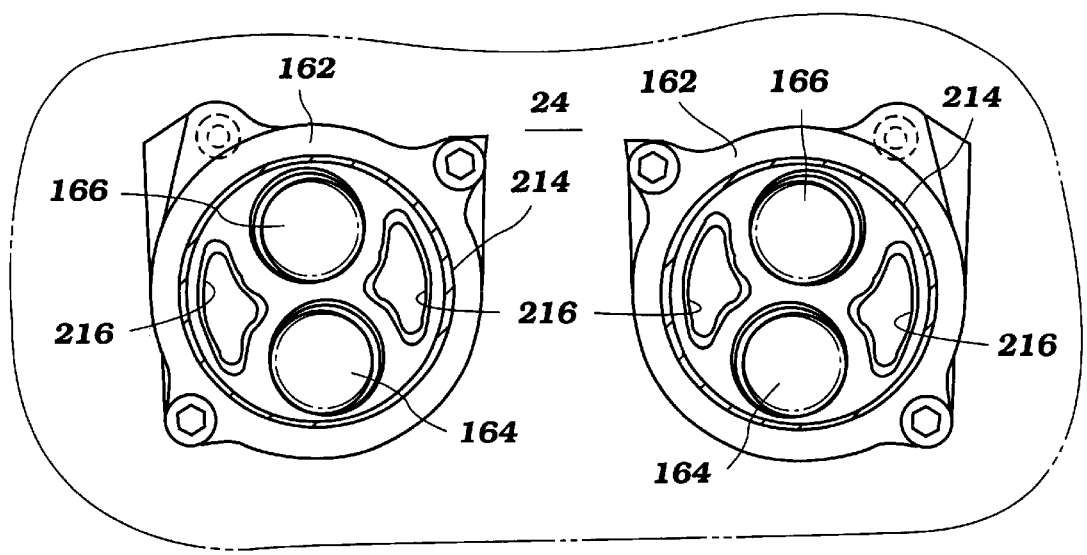
FIG. 9 is a sectioned view taken along the line 9—9 in FIG. 6 illustrating the tappet supporting assembly.

As best seen in FIG. 2, the cylinder blocks preferably have recesses 212 formed in one side thereof The push rods 174, 176 extend through these recesses and are encircled by push rod tubes 214. As seen in FIG. 9, the lower ends of the illustrated push rod tubes 214 are sealingly engaged with the tappet carrier member 162 that is fixed to the crankcase member 58 and thus provides a good seal and protection in this region. These tappet carrier members 162 are formed with lubricant return and crankcase ventilation openings 216 to permit lubricant supplied to operate the valve operating mechanism in the cylinder head assemblies 68 in a suitable manner to drain back to the crankcase of the present motorcycle 20. Also, these openings 216 facilitate crankcase ventilation, including that within the valve covers.

In a like manner, the upper ends of the push rod tubes 214 are sealingly engaged within projections 194 of the rocker arm carrier 190, and thus, the push rods 174, 176 are well protected. Also, the push rods 174, 176 can be easily removed for servicing, as should be readily apparent to those of ordinary skill in the art.

Figure 11:
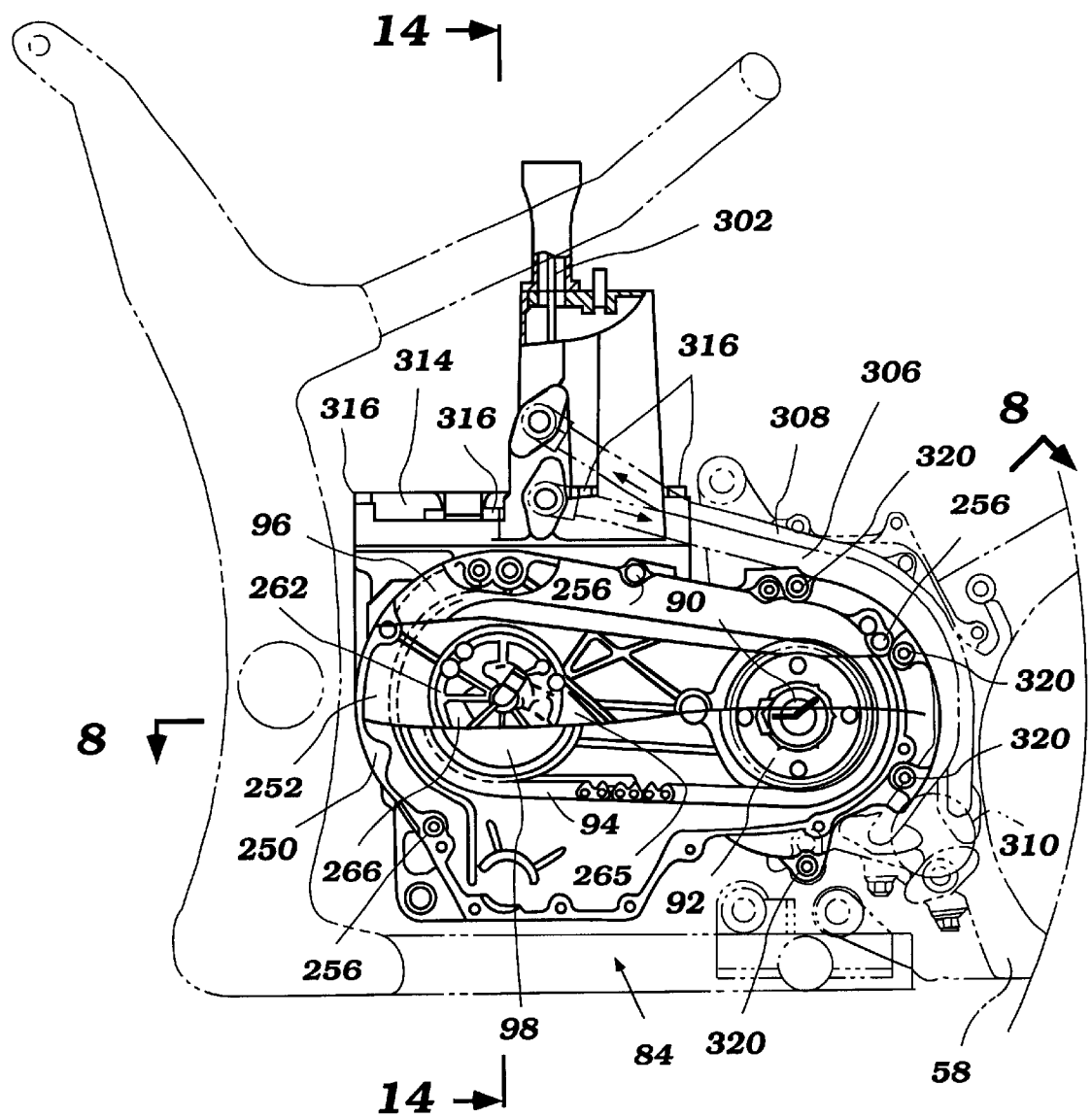
FIG. 11 is a sectioned side view of the gear box of the engine taken from the opposite side as FIG. 1.
Figure 13:
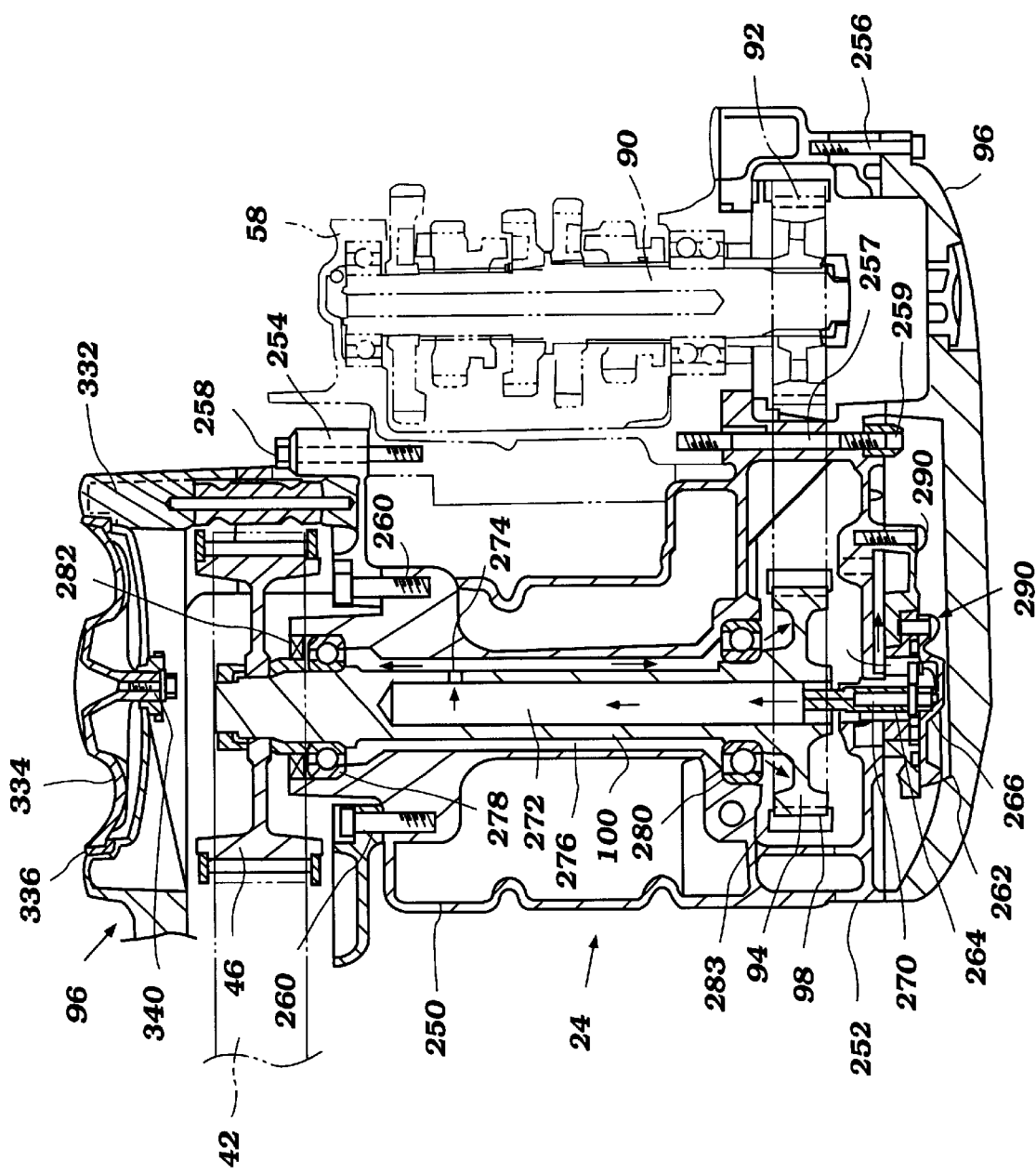
FIG. 13 is a sectioned top plan view of the gear box illustrating a drive lubrication system.
Figure 14:
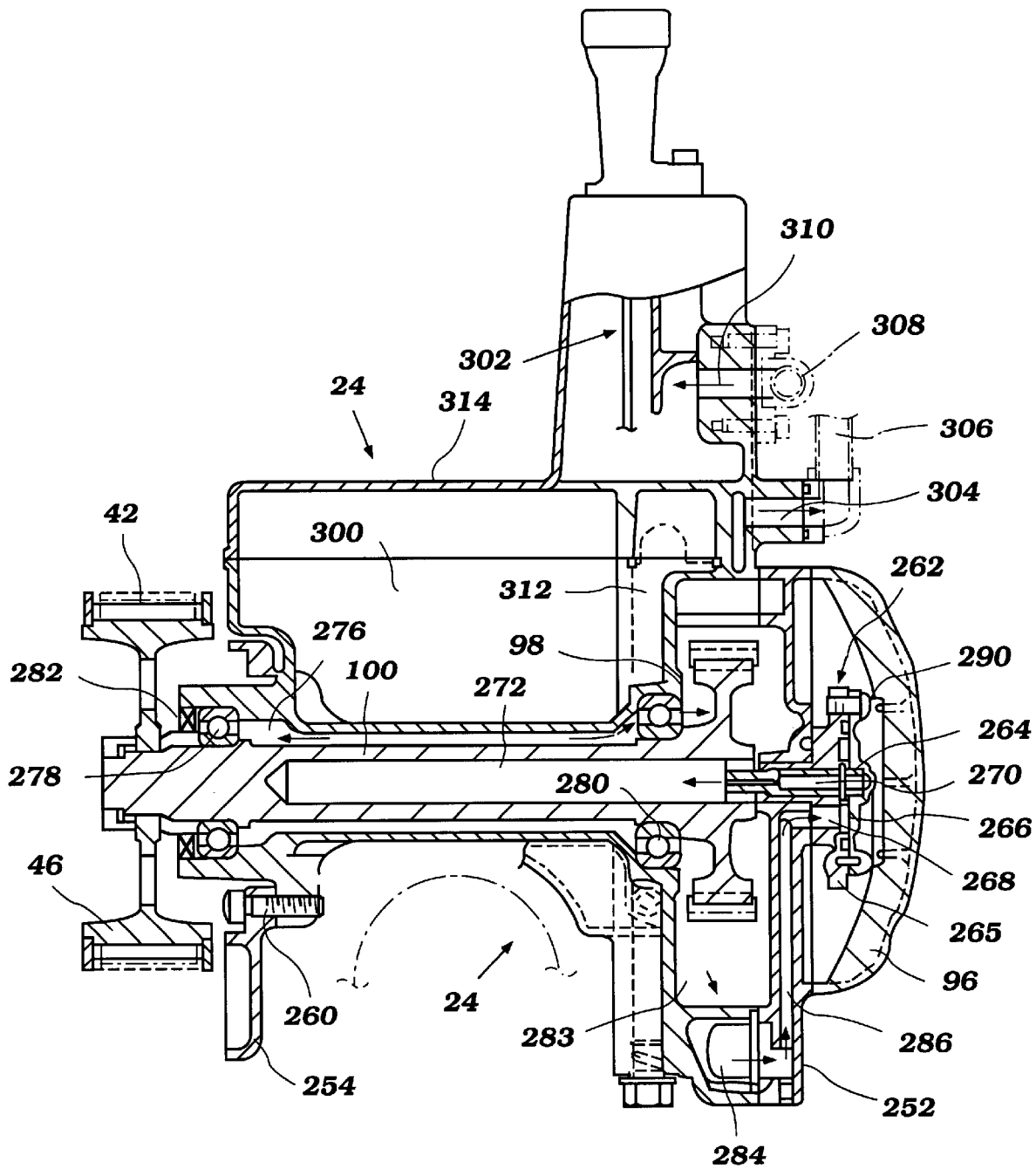
FIG. 14 is a sectioned rear elevation view of the gear box taken along the line 14—14 in FIG. 11 illustrating a drive lubrication system pump arrangement.

With reference now primarily to FIGS. 11, 13 and 14, the illustrated motorcycle 20 preferably includes a lubricating system for the transmission 84. This lubrication system is substantially contained within the crankcase of the transmission 84. As illustrated in FIG. 13, the crankcase 58 preferably includes a central member that defines a central body of the crankcase 58 and which is referred to by the reference numeral 250. To both sides of the central transmission case 250 are positioned end cases. Specifically, on the right side of the central dividing case 250 is positioned a right cap case, which is indicated by the reference numeral 252, while on the left side of the central case 250 is positioned a left cap case 254.

With continued reference to FIGS. 11, 13 and 14, the right cap case 252 is secured to the central case 250 through the use of threaded fasteners 256. Additionally, a threaded shaft 257 and a partially recessed nut 259 also are used to secure the two members together. The threaded shaft 257 also advantageously is connected to the gear case surrounding the intermediate shaft 90. Moreover, the left cap case is attached to both the central case 250 and the gear case through the use of threaded fasteners 258 and 260, as illustrated in FIGS. 12 and 13.

With reference again to FIGS. 11, 13 and 14, a lubrication pump for the transmission is generally indicated by the reference numeral 262. Generally, the lubrication pump 262 circulates lubricant within the transmission 24 to lubricate moving components of the transmission. In the illustrated motorcycle 20, the lubrication pump 262 is driven by the shaft 100, as illustrated in FIG. 13. Preferably, a hollow stub shaft 264 is connected to the shaft 100 such that as the shaft 100 turns, the shaft 264 also turns. The shaft 264 preferably includes an impeller, as known to those of ordinary skill in the art. A pump cover 266 covers a pump body 265 and creates a pump chamber from which lubricant is circulated throughout the transmission 24.

With reference now to FIG. 14, a lubricant flow path will be described in greater detail. The lubricant pump 262 preferably includes a suction port 268 and a discharge port 270. Preferably, the discharge port 270 forms an oil passage or lubricant passage that extends through the shaft 264, as illustrated in FIG. 14. The lubricant then flows through the shaft 100 within an oil passage formed within a central region of the shaft 100. This oil passage is indicated generally by the reference numeral 272.

With reference now to FIG. 13, the oil passage 272 communicates with a passage defined between the shaft and a portion of the central case 250. Specifically, the passage 272 communicates through the passage 274 through the shaft 100 with a further lubricant passage 276. As illustrated, the lubricant passage 276 allows lubricant to be passed along the shaft 100 to the sets of bearings 278, 280 that journal the shaft 100 for rotation within the central case 250.

With continued reference to FIG. 13, a seal 282 can be positioned on an outside edge of the bearing 278 to minimize leakage of lubricant from the transmission into the pulley 46. Lubricant can pass through the bearings 280 and lubricate the sprocket 98. Lubricant then returns through the oil passage 284 which is formed in the central case 250 and the oil passage 286 which is formed in the right cap case 252 to the suction port 268 to complete the circulation passage. It should be noted that the pump cover 266 can be secured in position on the pump through the use of threaded fasteners 290.

With reference again to FIG. 14, the present motorcycle 20 also includes a lubrication system for the engine which includes a lubricant tank 300. As is known, a ullage rod extends into the lubricant tank 300 to monitor the oil level or lubricant level within the lubricant tank 300. The ullage rod is indicated generally by the reference number 302.

The lubricant system for the engine 22 of the illustrated motorcycle 20 draws lubricant through a lubricant drain port 304 which then supplies lubricant through a lubricant supply passage 306 to the balance of the lubrication system. After circulating through the engine, lubricant is returned to the lubricant tank through the lubricant return passage 308 which communicates with a lubricant return port 310. The lubricant return port 310 in turn is in communication with a further lubricant return passage 312, which is positioned within the crankcase 58, and that directly communicates with the oil or lubricant tank 300. The lubricant is circulated through the use of a lubricant pump 310 in manners well known to those of ordinary skill in the art. Because the present invention does not relate to the lubricant system for the engine 22, the lubricant system for the engine 22 will not be described in further detail.

With reference now to FIG. 11, an upper cover 314 is secured to the case of the transmission 24 through the use of thread fasteners 316. This illustrated upper cover 314 encloses the lubricant reservoir. Also as illustrated in FIG. 11, a second set of threaded fasteners 320 are used to secured a portion of the right side cap case 252 to the central case 250.

Figure 15:
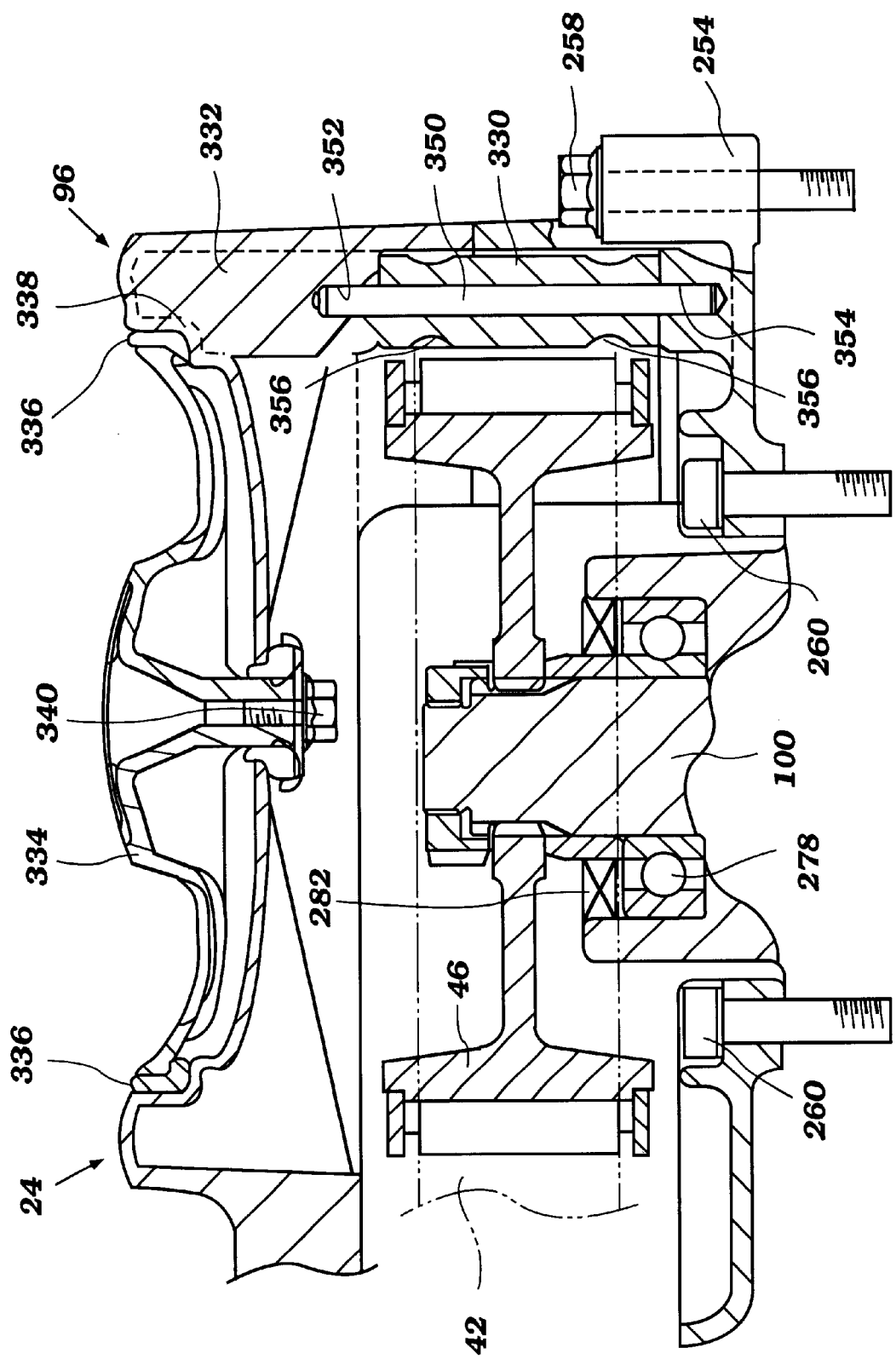
FIG. 15 is a sectioned view of the gear box taken along the line 15—15 in FIG. 12 illustrating a retaining member mounting assembly.
Figure 16:
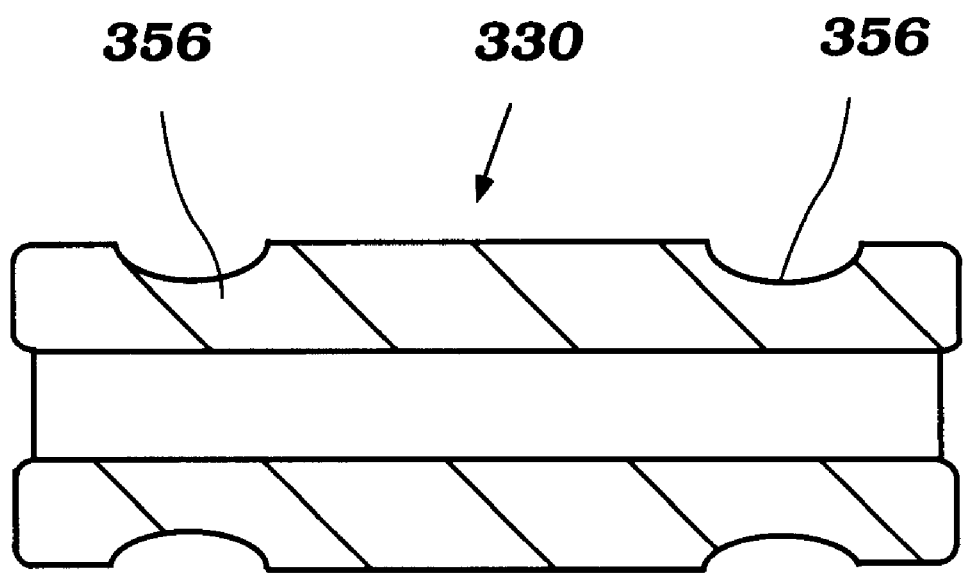
FIG. 16 is a sectioned view of a retaining member having features, aspects, and advantages in accordance with the present invention.

As will be understood from the above background of the invention, the present invention generally relates to retaining members that secure the flexible drive member 42 to the pulley 46. With reference now to FIGS. 15 and 16, a retaining member, which is indicated generally by the reference numeral 330, is illustrated. The retaining member 330 preferably is captured between a portion of the left cap case 254 and a cover member 332 that covers this portion of the final drive 24.

The cover member 332 also receives a maintenance cover 334, which is configured and arranged to reduce the vibration transmitted from the engine 22 to the cover 334. Specifically, a resilient member 336 is positioned around a periphery of the cover 334. The illustrated resilient member 336 mates with a ring groove formed within the cover 332. The ring groove is indicated generally by the reference numeral 338. The maintenance cover 334 is desirably connected to a flange portion of the cover 332 through the use of a central threaded fastener 340. Of course, other mounting arrangements and vibration damping arrangements may also be used.

The retainer member 330 is preferably journaled for rotation on a pin 350. Thus, the retaining member 330 forms a rotary guide member. The illustrated pin 350 is captured within a pair of substantially aligned holes 352, 354 that are formed in both the cover 332 and the left cap 254. As illustrated in FIG. 15, a substantial portion of the periphery of the retaining member 330 that faces the pulley 46 is not enclosed by the transmission casing. As will be recognized by those of ordinary skill in the art, either the retaining member 330 or the pin 350 can be journaled for rotation relative to the pin or the transmission case respectively. Desirably, the retaining member 330 rotates relative to the pin 350 and the pin 350 form a bushing or the like for the retaining member 330. Along these lines, at least one of the two components may be formed of such a material to effectively reduce wear of the other component. For instance, the pin may be formed of a harder material than the retaining member such that the retaining member, which has a larger thickness, wears first. Also, the materials chosen can be selected to reduce the likelihood of sticking or galling of the components.

The illustrated retaining member 330 advantageously presses the flexible drive member 42 into position on the pulley 46. Preferably, the retaining member 330 includes a pair of recesses or concavities 356 that are formed proximate an enlarged portion of flexible drive member 42 that extends the furthest away from the pulley 46. Thus, the majority of outer surface of the illustrated retaining member 330 forms a contact surface while the contact surface includes the recesses 356. For instance, in a chain, the side links have a larger width than the pins used to connect the side links and which form the portions of the chains which are gripped by the sprocket. In this manner, the retaining member or roller 330 can be positioned more closely to the pulley 46 to better secure the belt or chain 42 in position on the pulley 46. while the contact surface includes the recesses 356. For instance, in a chain, the side links have a larger width than the pins used to connect the side links and which form the portions of the chains which are gripped by the sprocket. In this manner, the retaining member or roller 330 can be positioned more closely to the pulley 46 to better secure the belt or chain 42 in position on the pulley 46.

With reference now to FIG. 12, the relative positioning between the pins 350 and rollers 330 as compared to the center of rotation of the pulley 46 will be described. As illustrated, the rollers are desirably positioned proximate an upper portion and a lower portion of the pulley 46. More preferably, the retaining members 330 are preferably positioned forward of a point at which the chain or belt 42 extends in a tangential direction relative to the diameter of the pulley 46. In this manner, the belt 42 or chain can exhibit some slight slacking properties, as explained above. Preferably, however, the rearward most member of the upper set of retaining members is positioned slightly forward of the location of the rearward most lower roller relative to the centerline of the shaft to which the pulley 46 (i.e., the distance between the upper and the shaft is more than the distance between the lower and the shaft). The difference in distances, illustrated in FIG. 12, is referred to by the reference letter D.

Because the illustrated transmission typically drives in a counter-clockwise direction, during rapid deceleration, the inertial forces on the rear tire of the motorcycle 20 cause the flexible drive member 42 to slack in the portion of the flexible drive member moving from the rear wheel to the drive pulley 46. However, during acceleration from decelerated states, the pulley tightens the flexible drive member in this portion while the other portion of the flexible drive member slacks. Thus, the slack in the upper portion of the flexible drive member is taken in by the pulley and the upper retaining members during deceleration while the slack in the lower portion of the flexible drive member is taken in by the pulley and the lower retaining members. Because the flexible drive member tends to skip from the pulley more often during acceleration (i.e., due to the increased loading and the like), the above-described arrangement of retaining members advantageously positions the retaining members in locations which reduce wear on the retaining members and the flexible drive member while aiding flexible drive member retention when most often desired.

Although the present invention has been described in terms of a certain embodiment, other embodiments apparent to those of ordinary skill in the art also are within the scope of this invention. Thus, various changes and modifications can be made without departing from the spirit and scope of the invention. For instance, various components can be repositioned as desired. Moreover, not all of the features, aspects and advantages are necessarily required to practice the present invention. Accordingly, the scope of the present invention is intended to be defined only by the claims that follow.

What is claimed is:

1. A motorcycle transmission comprising a change speed transmission and a final drive, said change speed transmission having an input gear positioned on a first lateral side of the motorcycle transmission and an intermediate pulley positioned on a second lateral side of the motorcycle transmission, an output pulley of said change speed transmission being positioned on said first lateral side and being connected to an output shaft of said change speed transmission, said final drive comprising said output pulley of said change speed transmission, a driven pulley, and a flexible drive member extending around said output pulley and said driven pulley, said driven pulley being positioned rearward of said output pulley, at least one retaining member rotatably mounted to a mounting shaft and positioned forward of said output shaft, said retaining member comprising an outer contact surface, said flexible drive member being interposed between said outer contact surface and said output pulley and said flexible drive member being secured to said output pulley by said outer contact surface.

2. The transmission of claim 1, wherein said outer contact surface is shaped to accommodate said flexible drive member.

3. The transmission of claim 1, wherein a generally horizontal plane extends through said output shaft and said retaining member is positioned above said generally horizontal plane.

4. The transmission of claim 1, wherein said flexible drive member extends in a tangential direction away from said output pulley such that an engagement location is defined at a contact area between said flexible drive member and said output pulley, said retaining member being positioned forward of said engagement location.

5. The transmission of claim 1 further comprising a drive lubrication system driven by said output shaft and supplying lubricant to at least one moving component of said change speed transmission.

6. The transmission of claim 3 further comprising an additional retaining member positioned below said generally horizontal plane.

7. The transmission of claim 4 further comprising a second retaining member positioned side by side with a first retaining member about a periphery of said output pulley.

8. The transmission of claim 6, wherein said retaining member is positioned further forward relative to said output shaft than said additional retaining member.

9. The transmission of claim 7 further comprising a cover and a crankcase member, said cover being attached to said crankcase member and said cover substantially encasing said output pulley and at least a portion of said flexible drive member.

10. The transmission of claim 9, wherein said retaining member is rotatably secured between said cover and said crankcase member.

11. A motorcycle transmission comprising a change speed transmission and a final drive, said change speed transmission having an input gear positioned on a first lateral side of the motorcycle transmission and an intermediate pulley positioned on a second lateral side of the motorcycle transmission, an output pulley of said change speed transmission being positioned on said first lateral side and being connected to an output shaft of said change speed transmission, said final drive comprising said output pulley of said change speed transmission, a driven pulley, and a flexible drive member extending around said output pulley and said driven pulley, said driven pulley being positioned rearward of said output pulley, a retaining means for securing said flexible drive member onto said output pulley, at least a portion of said retaining means being rotatably disposed, and said flexible drive member being interposed between said output pulley and said retaining means.

* * * * *